United States Patent [19]

Formaini

[11] Patent Number: 5,110,898

[45] Date of Patent: May 5, 1992

[54] METHOD FOR MANUFACTURING AMINO-ALDEHYDE COMPOSITIONS

[75] Inventor: Richard E. Formaini, Stone Mountain, Ga.

[73] Assignee: Georgia-Pacific Corporation, Atlanta, Ga.

[21] Appl. No.: 592,442

[22] Filed: Oct. 1, 1990

Related U.S. Application Data

[63] Continuation-in-part of Ser. No. 276,750, Nov. 28, 1990, Pat. No. 4,960,856.

[51] Int. Cl.$^5$ ............................................. C08G 12/40
[52] U.S. Cl. ................................... 528/256; 528/254; 528/259; 524/597; 524/598
[58] Field of Search .................... 528/256, 254, 259; 524/597, 598

[56] References Cited

U.S. PATENT DOCUMENTS

| | | | |
|---|---|---|---|
| 2,652,377 | 9/1953 | Kise | 523/340 |
| 3,118,849 | 1/1964 | Wagner | 524/512 |
| 3,183,200 | 5/1965 | Hewson | 524/598 |
| 3,198,761 | 8/1965 | O'Donnell | 524/843 |
| 3,428,607 | 2/1969 | Renner | 251/9 |
| 3,553,119 | 1/1971 | Curchod | 525/164 |
| 3,712,874 | 4/1970 | Strickrodt | 556/52 |
| 3,716,483 | 2/1973 | Renner | 210/693 |
| 3,819,332 | 6/1974 | Jaccard | 422/134 |
| 3,830,783 | 8/1974 | Vargiu | 523/348 |
| 3,842,039 | 10/1974 | Vargiu | 523/348 |
| 3,849,378 | 11/1974 | Griffiths | 528/487 |
| 3,869,311 | 3/1975 | Jacquelin | 428/511 |
| 3,896,087 | 7/1975 | Brunnmueller | 524/598 |
| 3,909,348 | 9/1975 | Economou | 162/166 |
| 3,926,917 | 12/1975 | Jaccard | 528/242 |
| 3,928,122 | 12/1975 | Giffiths | 162/166 |
| 3,928,272 | 12/1975 | Brancato | 528/232 |
| 3,931,063 | 9/1976 | Renner | 521/63 |
| 3,953,421 | 4/1976 | Berstein | 524/446 |
| 3,959,570 | 5/1976 | Jacquelin | 428/478 |
| 3,962,166 | 6/1976 | Gordon | 524/843 |
| 3,981,845 | 9/1976 | Renner | 428/402 |
| 4,010,132 | 3/1977 | Renner | 524/598 |
| 4,018,741 | 4/1977 | Renner | 528/242 |
| 4,021,413 | 5/1977 | Eisele | 528/259 |
| 4,035,328 | 7/1977 | Huang | 525/53 |
| 4,051,208 | 9/1977 | Jaccard | 264/5 |
| 4,058,434 | 11/1977 | Vincent | 162/165 |
| 4,064,088 | 12/1977 | Renner | 528/148 |
| 4,101,521 | 7/1978 | Renner | 528/242 |
| 4,130,498 | 12/1978 | Lee | 252/99 |
| 4,174,310 | 11/1979 | Hubbard | 523/340 |
| 4,224,423 | 9/1980 | Ogden | 525/515 |
| 4,239,646 | 12/1980 | Vincent | 438/402.21 |
| 4,247,433 | 1/1981 | Schamberg | 524/843 |
| 4,284,759 | 8/1981 | Henbest | 528/261 |
| 4,307,005 | 12/1981 | Renner | 524/512 |
| 4,367,171 | 1/1983 | Leifels | 524/47 |
| 4,381,368 | 4/1983 | Spurlock | 524/598 |
| 4,410,685 | 10/1983 | Williams | 528/259 |
| 4,433,133 | 2/1984 | Ifuku | 528/232 |
| 4,482,699 | 11/1984 | Williams | 528/260 |
| 4,501,851 | 7/1985 | Williams | 524/542 |
| 4,536,245 | 8/1985 | Shiau | 156/307.3 |
| 4,564,667 | 1/1986 | Taylor | 528/256.1 |
| 4,603,191 | 7/1986 | Kong | 528/259 |
| 4,691,001 | 1/1987 | Taylor | 528/256 |

FOREIGN PATENT DOCUMENTS

| | | |
|---|---|---|
| 86-118476 | 1/1970 | Japan . |
| 438731 | 3/1961 | Switzerland . |
| 522007 | 4/1966 | Switzerland . |

OTHER PUBLICATIONS

J. R. Bourne, et al., "Local pH Gradients and the Selectivity of Fast I: Mathematical Model of Micromixing", Chem. Eng. Sci., 43(8), pp. 1941-148 (1988).

T. Meyer, et al., "Micromixing In A Static Mixer And (List continued on next page.)

*Primary Examiner*—John Kight, III
*Assistant Examiner*—Sam A. Acquah
*Attorney, Agent, or Firm*—Banner, Birch, McKie & Beckett

[57] ABSTRACT

Ths invention relates to an improved method of preparing a solid amino-aldehyde condensation product wherein the solid condensation product precursor solution is fed to the bottom of the reaction vessel.

16 Claims, 1 Drawing Sheet

OTHER PUBLICATIONS

An Empty Tube by A A Chemical Method", Chem. Eng. Sci., 43(8), pp. 1955-1960 (1988).

R. Pohorecki, et al., "The Effects of Micromixing and the Manner of Reactor Feeding on Precipitation in Stirred Tank Reactor", Chem. Eng. Sci. 43(8), pp. 1949-1954 (1988).

Dan Luss, "Reaction Engineering of Advanced Ceramic Materials", (partial) Chem. Eng. Sci. 45(8) p. 1979-1981, 1999 (1990).

T. Meyer, et al., "Characterization of Segregation in A Tubular Polymerization Reactor By A New Chemical Method", Chem. Eng. Sci. 45(8), pp. 2793-2800 (1990).

G. Tosun, "An Experimental Study of The Effect of Mixing On The Particle Size Distribution In $BaSO_4$ Precipitation Reaction", Proc. 6th Europ. Conf. on Mixing (Paira), pp. 161-170 (1988).

T. Meyer, et al., "Micromixing In A Static Mixer And An Empty Tube By A Chemical Method", Chem. Eng. Sci., 43 (8), pp. 1955-1960 (1988).

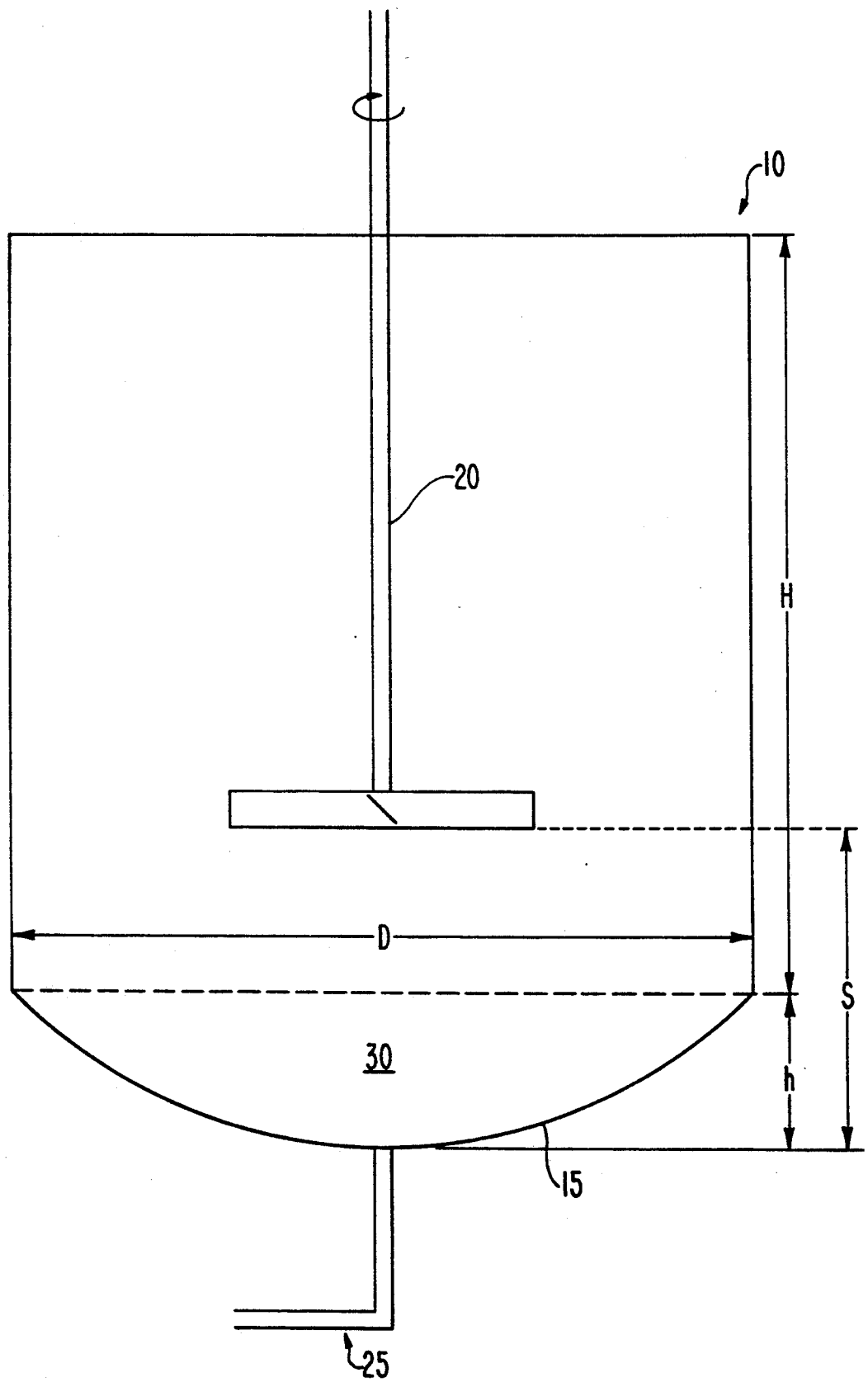

METHOD FOR MANUFACTURING AMINO-ALDEHYDE COMPOSITIONS

This application is a continuation-in-part of application Ser. No. 276,750, filed Nov. 28, 1990, entitled "Urea-formaldehyde Compositions and Method of Manufacture," now U.S. Pat. No. 4,960,856.

BACKGROUND OF THE INVENTION

1. Field of the Invention

This invention relates to a method for manufacturing an amino-aldehyde solid condensation product. More particularly, this invention relates to a method for manufacturing an amino-aldehyde condensation product wherein a liquid amino-aldehyde precondensate or liquid reactant mixture is introduced into the bottom of a pool of diluent liquid in which solid condensation product is formed.

2 Description of Related Art

Amino-aldehyde solid condensation products are well known and are put to a variety of uses. In particular, urea-formaldehyde pigments are useful as modifiers of cellulosic such as paper. Large quantities of inorganic pigments such as talc, kaolin, calcium carbonate, zinc sulfide, clay, titanium dioxide, and the like are employed as fillers in the production of paper products. Ordinarily, such inorganic pigments are effective in the preparation of paper products having suitable properties of brightness, opacity, basis weight, softness, smoothness, finish, and ink absorption.

An additive for cellulosic products such as paper must perform the functions of cellulosic products such as paper must perform the functions of an inorganic filler for which it is substituted if it is to gain wide commercial acceptance. Further, to be acceptable to the paper industry, a chemical additive for paper must be one which does not migrate from the base sheet to adjacently held absorbent material. Also, the additive must not cause "blocking", i.e., sticking together of adjacent paper layers when the paper is rolled or stacked sheet upon sheet.

Urea-formaldehyde condensation products are suitable as synthetic additives because they provide the above-described desired characteristics to paper and cellulosic products. Condensation products, also called condensate products because they often are prepared from an amino-aldehyde precondensate solution, result from the reaction of, in this instance, urea and formaldehyde to form the polymeric products. Combination of these monomer molecules with the elimination of water is known as a condensation reaction.

Suitable solid condensation products typically contain area and formaldehyde in a range of relative proportions and may be prepared in accordance with many known methods. Condensation products may be useful in more than one technology. For example, see U.S. Pat. No. 3,981,845, wherein a urea-formaldehyde condensation product is described as suitable both as an additive for paper and a reinforcing filler for rubber.

Typical methods of making urea-formaldehyde condensate products are disclosed in U.S. Pat. No. 3,981,845, 3,909,348, and 4,367,171. Other methods of making urea-formaldehyde resins are known. For example, in preparation method disclosed in U.S. Pat. No. 4,410,685, urea and formaldehyde are first reacted in a very acidic solution (i.e., pH less than about 2.5), then the reaction is completed under basic conditions. Such product typically is utilized as an adhesive or binder for woodcontaining constructions.

Typically, however, known preparation methods have drawbacks that make them less than satisfactory in commercial applications. In many known methods for preparing additives for paper, such as the method described in U.S. Pat. No. 3,981,845, a mixture of urea and formaldehyde or a urea-formaldehyde precondensate is polymerized.

In accordance with known methods for manufacturing aminoaldehyde solid condensation products, a liquid precondensate or a liquid mixture of reactants (amino and aldehyde reactants) is added to a liquid diluent pool in a vessel by "top-feeding," That is, the liquid precondensate or liquid reactant mixture is added in or at the upper surface or the pool of diluent liquid in the reaction vessel. The diluent is an aqueous liquid and may be acidic or basic, depending upon the characteristics desired in the solid condensate product. The diluent liquid also may contain catalyst.

Applicant has observed that when liquid precondensate or a liquid reactant mixture is "top-fed" into a well-mixed reactor, the pre condensate or reactant mixture rapidly mixes with the aqueous diluent and is quickly dispersed or diluted in the pool of liquid diluent. This occurs because the liquid pre-condensate or liquid reactant mixture has a density greater than the density of a suitable diluent liquid. Due to its higher density, the feed liquid quickly enters areas of the reaction vessel which are well-mixed and is rapidly mixed throughout the reaction vessel. Under conditions of adequate mixing in the top-fed arrangement, the local concentration of precondensate or liquid reactants never exceeds the final (steady-state) concentration of precondensate or liquid reactants in the reactor. Consequently, the rate of reaction, which varies directly with the reactant concentration in the liquid phase, i.e., it decreases as the concentration of precondensate or reactant mixture in the diluent decreases, is initially at its lowest value.

SUMMARY OF THE INVENTION

The present invention is directed to an improved method for manufacturing an amino-aldehyde solid condensation product. More particularly, the present invention relates to a method for enhancing the rate of the condensation reaction when manufacturing aminoaldehyde solid condensation products suitable for use as a paper additive which comprises feeding a liquid amino-aldehyde precondensate or liquid reactant mixture at or near the bottom of a liquid diluent pool in which solid amino-aldehyde condensate product is formed, i.e. the reactant, whether liquid precondensate or a mixture of liquid reactants, is "bottom-fed". The liquid amino-aldehyde precondensate solution and the liquid reactant mixture, on occassion, are generically referred to herein as the "solid condensation product precursor liquid".

A key aspect of the present invention is that the solid condensation product precursor liquid is fed into the reaction vessel in a region where the level of agitation is lower than exists elsewhere in the reactor. This region of lower agitation is preferably established by "bottom feeding" of reactants below the mixer of a conventional agitated reactor and the invention will be described herein for simplicity in terms of this embodiment. Feeding of liquid pre-condensate or liquid reactant mixture, which has a density greater than the density of the diluent liquid to which it is added, at or near the bottom surface of a pool of diluent in a less intensely mixed region of the reactor below the mixer, helps maintain a high concentration of pre condensate or reactants in contact with the diluent. Because the reaction rate increases as the precondensate or reactant mixture concentration in diluent liquid increases, the reaction rate achieved by "bottom-feeding" is greater than the reaction rate achieved by "top-feeding."

In particular, the method of the invention is suited for manufacture of solid urea-formaldehyde (U-F) or melamine-urea-formaldehyde (M-U-F) condensation products suitable for use as a substitute for titanium dioxide as an opacifier in the manufacture of cellulosic products.

The method of the invention is particularly well suited for the preparation of solid amino-aldehyde condensation products by acid catalysis. The condensation products are made by reacting an aldehyde with an amino in amounts such that the mol ratio of aldehyde groups to amino groups in the reactants is less than one. Preferably, the ratio of aldehyde groups to amino groups in the reactant mixture (aldehyde:amino) is within the range of about 0.5:1.0 to 0.85:1.0. In the case of urea and formaldehyde reactants this range corresponds to using a formaldehyde (F) to urea (U) mol ratio, i.e. F/U mol ratio, of between about 1.0:1.0 and 1.7:1.0. Preferably a F/U mol ratio of 1.25:1.0 is employed. By conducting the reaction in a well-mixed reactor, the solid condensation products comprise substantially spherical, amorphous particles having a particle size of up to about 1.5 microns, which particles form agglomerates. The product is supplied in aqueous slurry form or as dried agglomerates having a mean average agglomerate size up to about 20 microns.

The invention further relates to a method of making amino-aldehyde solid condensation products by charging the liquid precondensate solution or liquid reactant mixture into an agitated, acidified liquid diluent pool at or near the bottom surface of the liquid diluent and reacting said liquid precondensate or liquid reactant to convert the water-soluble precondensate or reactant mixture to insoluble particles of the condensation product, i.e., the solid condensate products described above. A key feature of the present invention is that the reaction vessel, though generally well-mixed, has a small zone or region below the mixer where there exists a lower level of agitation. The reactants are fed into this region.

BRIEF DESCRIPTION OF THE DRAWING

The sole figure is a schematic illustration in cross section showing a reaction vessel for conducting the amino-aldehyde condensation reaction of the present invention.

DETAILED DESCRIPTION OF THE INVENTION

The condensation reaction of amino and aldehyde proceeds more quickly and concomitant savings are realized when the solid condensation precursor liquid, i.e., a liquid precondensate solution or liquid reactant mixture is "bottom-fed," i.e., is introduced at or near the bottom surface of a generally well-mixed pool of diluent liquid. At the bottom of the reactor there exists a small region or zone where the level of mixing is not as intense as elsewhere in the reactor. Because the density of the precondensate solution or reaction mixture is greater than the density of the diluent, bottom-feeding introduces the liquid into this region and transiently retards its mixing with the rest of the contents of the reactor. Thus, the dilution of the solution or mixture into the diluent liquid is delayed for a short period. It has been discovered that bottom-feeding produces a transient condition of locally high precondensate solution or reactant mixture concentration in the diluent liquid pool and that such a condition provides a higher reaction rate.

As used throughout this specification and claims, the term "liquid precondensate solution" means a solution in which at least one amino has been reacted with at least one aldehyde to form an aminoaldehyde solid condensation product which is soluble in water. A "liquid reaction mixture" is a mixture of amino and aldehyde which, under proper conditions, forms a solid condensation product.

For the purposes of this invention, pre-condensate solution or liquid reaction mixture must have a density greater than the diluent into which it is introduced. Any density difference is suitable for the purposes of this invention. Skilled practitioners recognize that a larger density difference retards dilution of the solution or mixture more effectively than a smaller density difference. Preferably the density of the precondensate solution or liquid reactant mixture is at least about 2.0% higher than the density of the diluent liquid. Generally, the solid condensation product precursor liquid will have a density about 5 to 10% higher than the diluent liquid.

Aminos suitably utilized in the method of this invention include urea; thiourea; guanidine; dicyandiamide; alkyl-ureas; cyclic alkyleneureas; aminotriazines, such as melamine, ammelide, and ammeline; substituted melamines, such as butyl-melamine and phenyl-melamine; and guanamines, such as acetoguanamine, and benzoguanamine. Mixture of aminos also may be utilized.

Aldehydes suitably used in the method of this invention include formaldehyde, acetaldehyde, butyraldehyde, acrolein, crotonaldehyde, furfural and glyhoxal. Of course, a mixture of aldehydes may be utilized.

Selection of a particular amino or blend thereof and of an aldehyde or blend thereof is within the skill of a practitioner. In particular, not only technical considerations, such as the properties and characteristics of the condensation product to be produced, but also business considerations, such as the availability and cost of reactants, affect the selection of amino and aldehyde. For example, urea and melamine typically are utilized, together with formaldehyde, to form condensation products, including resinous materials and solid, infusible particulates, which have a variety of uses. Thiourea also is utilized. Urea and formaldehyde are utilized often because they are inexpensive and readily available. Although melamine is more expensive, it provides additional amino functionality in a heterocyclic molecule. Therefore, condensate products comprising urea, melamine, and formaldehyde often are manufactured.

Although the method of the invention is described herein with particularity with respect to urea-formaldehyde, the disclosure is addressed to other amino-aldehyde systems as well. Urea-formaldehyde systems are merely more conveniently described, in view of inter alia, the relative costs of reactants.

The amino and aldehyde reactants can be added into the reactor as a liquid admixture, or more preferably as an aqueous partial reaction product, i.e., a precondensate. Skilled practitioners recognize that many pre-condensate solutions are not stable for a long period. Such limited-stability solutions are suitable for use in the method of the invention but typically are utilized shortly after they are prepared. Solutions which are stable for longer periods also are suitably used in the method of the invention and generally are preferred. A particularly useful precondensate is the one described in U.S. Pat. No. 4,960,856, the disclosure of which is incorporated herein by reference.

One of the many uses of amino-aldehyde condensate products, particularly urea-formaldehyde or urea-melamine-formaldehyde products, is as an opacifier in the manufacture of cellulosic products, such as paper. A condensate product suitable for such use typically would be a water-insoluble, fine, particulate material which may form agglomerates.

The method of this invention is particularly suited for reacting a stable urea-formaldehyde or urea-melamine-formaldehyde precondensate solution to produce a water-insoluble particulate product suitable for use as an opacifier of cellulosic products.

The liquid into which the precondensate solution or mixture of liquid reactants is introduced can be aqueous, organic or mixtures thereof. The aqueous liquid typically is acidified to a pH between about 1.0 and 4.0, preferably between about 1.0 and 2.0, and most preferably about 1.2, with a mineral acid. Suitable acids include sulfuric acid, hydrochloric acid, and nitric acid. Sulfuric acid (in concentrated solution, i.e., about 96 weight percent $h_2SO_4$) is a preferred acid. Equivalent levels of acidity can be provided to organic liquid as recognized by those skilled in the art. Those skilled in the art recognize that acid-resistant material of construction will be required for the vessel. The acidified liquid (diluent liquid) into which the precondensate solution or reactant mixture is charged and further reacted can be essentially formaldehyde-free, or a formaldehyde-rich liquor can be recycled from a subsequent decantation or condensate filtration step. Alternatively, a "synthetic recycle" can be prepared and utilized. In any event, the amino and aldehyde content of the diluent pool must be considered when determining the proper amino to aldehyde ratio to use in the solid condensation product precursor liquid.

Urea, melamine, and formaldehyde may be supplied in any convenient form from which a solution having the desired aldehyde to amino ratio can be prepared. Typically, formaldehyde is available in aqueous solution of various strengths, sometimes in combination with urea. Such solutions conveniently are used in the method of this invention. Solutions containing about 50 weight percent formaldehyde or aqueous sources containing both urea and formaldehyde, such as a commercially-available solution containing about 25 weight percent urea, about 60 weight percent formaldehyde, and about 15 weight percent water, are preferred. Such solution is available under the trademark STA-FORM 60 ®. similarly, urea is available as, for example, a 45 weight percent aqueous solution.

Similarly, melamine can be supplied in either its monomeric form or as a melamine-aldehyde precondensate, i.e., a melamine resin.

Skilled practitioners recongnize that both urea and formaldehyde are very soluble in water, so solutions having essentially any concentration of urea and formaldehyde in the described ratio may be prepared. However, skilled practitioners also recognize that water should be present in a concentration of between about 5 and 60 weight percent, preferably between about 10 and 45 weight percent, so that the resulting urea-formaldehyde precondensate solution is not so dilute that it requires larger storage volumes, nor so concentrated that it is too viscous or for other reasons not conveniently transported in commerce.

Skilled practitioners also recognize that concentrated formaldehyde solutions may contain a large quantity of formic acid. Thus, even after adding urea, which forms mildly basic aqueous solutions, or urea and melamine, the pH may remain very low, i.e., less than about 4. Thus, it may be necessary to treat the formaldehyde solution before it is used, for example, by treating it with ion exchange resin, to remove the acid. In the alternative, the pH may be adjusted to neutral to basic conditions by first adding basic material such as NaOH (caustic) to the formaldehyde, adding urea, or urea and melamine, and beginning reaction, then adjusting the pH to the acid conditions described below for further reaction.

The reaction of urea and formaldehyde to form precondensate typically is catalyzed by acid. Any acid which provides a pH in the liquid diluent pool between about 3.5 and 4.25, preferably between about 3.75 and 4.0, when present in catalytically active quantity at the beginning of reaction, typically is used. Any strong acid, such as mineral acids and organic acids such as the stronger carboxylic acids, is suitable. Thus, suitable acids include formic acid, acetic acid, chloracetic acids, acrylic acid, oxalic acid, malonic acid, maleic acid, tartaric acid, citric acid, sulfurous acid, nitric acid, phosphoric acid, sulfuric acid and hydrochloric acid. Formic acid is preferred because it is a sufficiently strong acid and is relatively non-corrosive.

A quantity of protective colloid or dispersant preferably is added to prevent the formation of large-size particles as the condensation reaction proceeds. Although the likelihood of forming over-sized particles is greater during a subsequent reaction phase under highly acid conditions, colloid conveniently is added to the solid condensation product precursor liquid. Alternatively the colloid can be introduced directly into the condensation reactor. Examples of suitable protective colloids include sodium salt of carboxymethyicellulose, methylcellulose, ethylcellulose and beta-hydroxyethylcellulose, polyvinyl alcohol, and water-soluble polymers and copolymers of acrylic or methacrylic acid. Polyvinyl alcohol is a preferred protective colloid. Widely available aqueous solutions containing between about 1 and 10 wt percent polyvinyl alcohol conveniently are utilized; 1 percent solution is preferred. The quantity of protective colloid required is known to skilled practitioners.

In accordance with the method of the invention, solid condensation product precursor liquid, i.e., either precondensate solution or a mixture of liquid reactants is further reacted to form amino-aldehyde condensation product by "bottom-feeding," i.e., introducing the precondensate solution into a diluent pool, typically acidified liquid as described below, at or near the bottom surface of the diluent pool.

The precondensate solution is bottom-fed as quickly as possible to agitated, acidified diluent liquid in the reactor at a temperature typically between about 38°–46° C., preferably about 40° C. Both agitation and the quick combination of the liquids, i.e., the precondensate solution and the liquid in the reactor, ensure that the amino-aldehyde condensation particles do not become excessively large by minimizing the formation of localized hot spots. As those skilled in the art recognize, the degree of agitation required during mixing and subsequent reaction depends upon the concentration of the reactants and of the subsequently-formed slurry.

With reference to the sole figure, the method of the invention will be briefly described. Reactor 10 can be a conventional glass-lined resin reactor having a dish-shaped bottom 15 and fitted with a mixer 20. Reactor 10 is a generally cylindrical vessel having a diameter D and an overall height measured from the bottom of dish 15 of H+h. Mixer 20 can be of conventional design, such as a three or four-bladed impeller or turbine. Mixer 20 is positioned a distance S above the bottom of reactor 10.

In accordance with the method of the present invention, reactor 10 is first charged with an acidified diluent liquid. The diluent liquid typically has a density of about 1.02 grams per milliliter. The mixer is activated, so as to establish generally well-mixed conditions in reactor 10. Due to the design, however, and in particular due to the positioning of mixer 20 above the bottom of reactor 10, a region or zone 30 is established which has a lower level of agitation than prevails throughout most of the remaining reactor volume. The solid condensation product precursor liquid is fed into region 30 through conduit 25. Typically, the solid condensation product precursor liquid has a density of about 1.09 grams per milliliter. This density is greater than the density of the pool of diluent liquid. As a consequence into a region of less intense agitation, dilution of this liquid is briefly delayed.

Applicant has surprisingly discovered that such a condition significantly enhances the kinetics of reactor 10 as compared to the conventional expedient of top feeding such that substantial economy is realized in the process. For example, applicant has determined that for the top-feed arrangement, the required reactor volume (size) at 65° C. is about 2.2 gallons per pound of solid condensate produced per hour; while at the lower reaction temperature of 50° C. the bottom-feed arrangement of the present invention requires only about 0.84 gallons of reactor volume per pound of solid condensate produced per hour.

It has been discovered that bottom-feeding the precondensate solution or reactant mixture into the diluent achieves a significantly higher reaction rate than does top-feeding. Although the inventor does not wish to be bound by this theory, it is believed that the density difference between diluent and pre-condensate solution or reactant mixture is sufficient to create a resistance to mixing. Therefore, it is believed that the concentration of pre-condensate or reactant mixture remains high for a short time period, thus affording a high reaction rate. This delay must not be so long however that it leads to gelation or the formation of oversized particles of solid condensation product. Those skilled in the art, with routine experimentation, can vary the relative design of the reaction vessel and the kind and location of the mixer to obtain a wide variation in results.

After feeding the precondensate solution or liquid reactant mixture into the reactor, the temperature of the reaction mixture is increased, typically at a rate of about 1° C. per minute, until the temperature is within about 10° C. of the subsequent reaction temperature, at which time the temperature can be raised at a rate of about 3° C. per minute. Heating is stopped when the temperature is between about 40° and 80° C., preferably between about 45° and 70° C., and the precondensate is further reacted at this temperature for a period sufficient to convert the water-soluble precondensate to insoluble methylene-containing urea-formaldehyde or urea-melamine-formaldehyde condensate product. Skilled practitioners recognize that the degree of completeness of reaction is an economic choice, and that reaction may be stopped after as little as ¼ hour. At the typically preferred temperatures, the period required to complete the reaction is between about ½ and 4 hours, with shorter periods required at higher temperatures.

The relative quantity of precondensate solution or reactant mixture and acidified liquid is established so that, upon manufacture of the urea-formaldehyde or urea-melamine-formaldehyde condensate product, the resulting slurry is sufficiently stable and has a solids concentration which conveniently can be further treated. This is, the solids concentration should not be so high that a significant quantity of urea-formaldehyde or urea-melamine-formaldehyde condensate product precipitates out of the slurry, or that the slurry cannot be handled, for example, is difficult to transport between vessels for further treatment. Similarly, the slurry should not so dilute that large quantities of liquid must be treated or removed during subsequent processing steps. Typically, the solids concentration, i.e., the percent of nonvolatile material within the slurry, is between about 5 and 20 wt. percent, more typically between about 10 and 15 wt. percent.

The insolubility of the urea formaldehyde or urea-melamineformaldehyde condensate product causes it to form a slurry as the reaction proceeds. This slurry is cooled to ambient temperature, then preferably is treated with a base to raise the pH to between about 7.5 and 8.5, more preferably to between about 7.8 and 8.2. Preferred basic compositions include sodium hydroxide and calcium hydroxide; potassium hydroxide also may be utilized. However, use of ammonium solution at this point precludes recycle of formaldehyde-rich liquor from either the decantation step or the dewatering step described below. Neutralized slurry then is wet-milled to comminute large particles which may have formed and to ensure that all particles are reduced in size to less than about 10 microns.

Further treatment of the wet-milled slurry depends upon the form in which the urea formaldehyde or urea-melamine-formaldehyde condensate product will be provided. Product in slurry form is prepared by decanting excess liquid, if necessary, to increase the solids content to at least about 12 wt. percent, preferably about 15 wt. percent. Then a formaldehyde scavenger such as urea, sodium sulfite, or ammonia is introduced into the slurry to scavenge unreacted formaldehyde in a process well known to those skilled in the art. The decanted liquid contains formaldehyde and can be recycled to provide at least a portion of the acidified liquid in which precondensate is further reacted, as described above.

If the urea formaldehyde or urea-melamine-formaldehyde condensate produce is to be supplied as dried agglomerates, the slurry is dewatered in any suitable fashion to increase the solids concentration to at least about 20 wt. percent, preferably at least about 24 wt. percent. Any type of dewatering process, such as vacuum filtration or centrifugation, may be utilized. The separated liquid contains formaldehyde and can be recycled to provide at least a fraction of the acidified liquid to which precondensate solution is added, as described above.

Dewatered filter cake then is dried in any heated gas inert to urea formaldehyde or urea-melamine-formaldehyde condensate polymer. Preferably, air heated to a temperature of between about 150° and 300° C., preferably between about 200° and 250° C., is utilized. The solids content of the dried cake typically is at least about 25 wt. percent, preferably between about 35 and 50 wt. percent. Typically, the quantity of water allowed to remain in the cake is a matter of design choice. Dried agglomerate then is fed into an appropriate mixer wherein ammonia can be reacted with the solid product to scavenge unreacted formaldehyde. A ribbon mixer is suitably utilized to combine the ammonia with the dried slurry. Thus-treated solid is bagged or put in other containers for shipment or storage.

The urea formaldehyde or urea-melamine-formaldehyde condensate product produced in this manner will have particle size typically between about 0.2 and 1.2 microns, and dried agglomerates will have a mean agglomerate size of up to about 20 microns, preferably up to about 10 microns. Because the urea formaldehyde or ureamelamine-formaldehyde precondensate was quickly mixed with and further reacted in agitated, very acidic solution, the resulting urea formaldehyde product particles are substantially spherical, amorphous, and nonporous, and have a dimpled surface.

The product exhibits an oil absorbency typically at least equal to 100 grams of oil per 100 grams of product, preferably between about 135 and 260 grams of oil per 100 grams of product, as determined by the procedure described in ASTM Method D281-31. BET specific surface area, determined in a manner recognized by those skilled in the art, typically is in the range of 0.5–25 $m^2/g$, preferably between about 0.5 and 20 $m^2/g$. This product is particularly suited for use as a paper additive when substituted for titanium dioxide as an opacifier when the BET specific surface area range is preferably about 5–20 $m^2/g$.

An aqueous solution intended to represent a "synthetic recycle" also may be utilized to provide at least a portion of the acidified liquid in which the urea formaldehyde or urea-melamine-formaldehyde precondensate is further reacted. This "synthetic recycle" can, for example, be made up of an aqueous solution of sodium sulfate, formaldehyde, methylol-urea compounds, and other components typically found in recycled liquid, i.e., liquid recovered from the abovedescribed decantation or filtration.

The following examples are presented to further illustrate the invention, and are not to be considered limiting in any way. The invention is limited only by the scope of the appended claims.

EXAMPLES

Throughout the Examples, all parts are on a weight basis unless otherwise noted.

Urea formaldehyde precondensate and urea formaldehyde condensation products made therefrom were made in a plurality of batches, the products of which were blended and applied to paper products. As described below, the product of the invention prepared in accordance with the method of the invention, served as suitable substitute for titanium dioxide as an opacifier.

A. Preparation of Urea Formaldehyde Precondensate

A mixture of 423 parts water and 0.2 parts AF-75 (antifoaming agent) is added to a reactor and stirred. Then, 12.3 parts Vinol 205 ® (a polyvinyl alcohol protective colloid) are added slowly and the mixture is heated to 60° C. to dissolve all components. The temperature is reduced to 40° C., then 334 parts of STA-FORM 60 ® are added. The pH is reduced to between about 4.0 and 4.3 by adding about 2 parts 90 percent formic acid aqueous solution.

After addition of 50 parts of urea, the mixture is heated rapidly to 80° C. This temperature is held for about 15 minutes, then quickly lowered to 60° C. Addition of 2 parts of 50 percent aqueous caustic solution raised the pH to between about 7.5 and 9.0. Then, 170 parts of urea are added, and, after about 20 minutes of reaction time, the temperature is lowered to ambient temperature, i.e., between about 25° and 32° C.

B. Preparation of Urea Formaldehyde Condensate Product

Six hundred forty-five parts of water are charged to a stirred 100 gallon reactor having a design similar to the sole figure. In the reactor the parameters H, h, D, and S respectively had the following values 37", 4.25", 30" and 5.25". The reactor also was fitted with a three-bladed mixer that had a nominal (fixed) speed of about 80 RPM. Four parts 96 percent aqueous sulfuric acid solution are added to the agitated liquid, together with 22 parts sodium sulfate. A vacuum is applied to the reactor to assist in precondensate charging. The mixture is heated to 40° C., and 244 parts of previously prepared precondensate are added below the agitator blade within a period of about 1 minute.

The temperature of the mixture is raised to 65° C. at 1° C./minute. The mixture is allowed to react at a temperature between about 65° and 68° C. for 1.5 hours. Thereafter, the temperature is reduced to 45° C. by using a combination of cooling water and pressure reduction to cool the mixture by evaporating water. Then, the vacuum is released, and 6 parts 50 percent sodium hydroxide aqueous solution are added, increasing the pH to between about 7.5 and 9.0. Simultaneously, the temperature is reduced to 35° C. Then, agitation of the resulting product was stopped.

C. Recovery of Formaldehyde rich Solution for Recycle and Preparation of Product Slurry Urea formaldehyde condensate product slurry prepared as described in step B in the amount of 921 parts is allowed to settle, unagitated, for about 1 hour. Although urea-formaldehyde particles are present throughout the settled slurry, two layers form: formaldehyde-rich recycle fluid with fewer urea-formaldehyde particles over particle-rich product slurry on the bottom. Then, at least about 150 parts of recycle containing few urea-formaldehyde condensate product particles is withdrawn through vacuum lances symmetrically placed around the reactor. An equal quantity of water subsequently is added through the lance in a similar manner.

A second portion of formaldehyde-rich liquid, up to about 150 parts, is siphoned off. Then, a quantity of water typically up to about 100 parts, may be added to the re-suspend slurry so that the agitation can be easily and safely accomplished within the limits of, inter alia, the power of the agitator and the solids concentration in the slurry.

Thereafter, about 0.3 parts of Kelzan-S (a suspending agent derived from seaweed) and 10 parts urea (formaldehyde scavenger) is added and the vessel is agitated for about 30 minutes.

D Preparation of Paper Containing Product of the Invention and Comparison to Known Opacifier Products Pigment prepared as described in this Example was substituted for a major portion of titanium dioxide in a pigment and compared with 100 percent titanium dioxide. Although operating difficulty with the paper processing machine caused increased moisture concentration in the paper and decreased pigment retention as the test proceeded, this example illustrates the suitability of the opacifier product of the invention.

The following tests were run seriatim:

| Test | Opacifier | Quantity | Retention |
|------|-----------|----------|-----------|
| A | Titanium dioxide | 100 lb/T | 71.3 |
| B | 40 percent titanium dioxide/60 percent pigment of this invention | 132 lb/T | 68 |
| C | 40 percent titanium dioxide/60 percent pigment of this invention | 100 lb/T | — |

In each test run, the remainder of the filler components remained unchanged.

The Table below summarizes the key results from testing of the paper made in the 3 above-described tests.

TABLE 1

| Test | Basis Wt., g/m² | Caliber (Thousandths) | Gurley Porosity | Opacity | Brightness |
|------|-----------------|----------------------|-----------------|---------|------------|
| A | 76.15 | 4.56 | 17.0 | 92.6 | 83.7 |
| B | 74.22 | 4.94 | 9.9 | 91.0 | 84.8 |
| C | 73.48 | 4.89 | 7.7 | 91.0 | 86.5 |

Although preferred embodiments of this invention have been described herein, skilled practitioners recognize that changes and modifications may be made without departing from the spirit of the invention, as defined in and limited only by the scope of the appended claims.

I claim:

1. In a method for manufacturing insoluble amino-aldehyde particles wherein a solid condensation product precursor liquid is introduced into a reactor containing an acidified diluent liquid having a temperature between about 38° and 46° C. and said precursor liquid is mixed with said acidified liquid by agitation to form an intimate mixture; and said mixture is then reacted at a temperature between about 45° and 80° for a time sufficient to convert the precursor liquid to insoluble amino-aldehyde particles, the improvement comprising introducing said precursor liquid into said diluent in a zone of said reactor having a level of agitation lower than that necessary to form said intimate mixture.

2. The method of claim 1 wherein the ratio of aldehyde groups to amino groups in the intimate mixture is between about 0.5:1.0 and 0.85:1.0.

3. The method of claim 1 wherein the precursor liquid comprises urea and formaldehyde.

4. The method of claim 3 wherein the precursor liquid further comprises melamine.

5. The method of claim 2 wherein the precursor liquid comprises urea and formaldehyde.

6. The method of claim 5 wherein the precursor liquid further comprises melamine.

7. The method of claim 1 wherein the density of the precursor liquid is at least about 2.0 percent higher than the density of the diluent.

8. The method of claim 7 wherein the density of the precursor liquid is at least about 5.0 percent higher than the density of the diluent.

9. The method of claim 3 wherein the density of the precursor liquid is at least about 2.0 percent higher than the density of the diluent.

10. The method of claim 9 wherein the density of the precursor liquid is at least about 5 percent higher than the density of the diluent.

11. The method of claim 10 wherein the density of the precursor liquid is between about 5 and 10 percent higher than the density of the diluent.

12. The method of claim 1 wherein the diluent liquid has a pH between about 1.0 and 4.0.

13. The method of claim 12 wherein the diluent liquid has a pH between about 1.0 and 2.0.

14. The method of claim 5 wherein the diluent liquid has a pH between about 1.0 and 4.0.

15. The method of claim 12 wherein the diluent liquid comprises acid selected from the group consisting of sulfuric acid, hydrochloric acid, and nitric acid.

16. The method of claim 14 wherein the diluent liquid comprises acid selected from the group consisting of sulfuric acid, hydrochloric acid, and nitric acid.

* * * * *